(12) United States Patent
Honda

(10) Patent No.: US 6,256,170 B1
(45) Date of Patent: Jul. 3, 2001

(54) THIN FILM MAGNETIC HEAD HAVING CLOSELY SPACED WIRES CONNECTING HEAD DEVICE WITH BONDING PADS

(75) Inventor: Kenji Honda, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 09/436,966

(22) Filed: Nov. 9, 1999

(30) Foreign Application Priority Data

Nov. 12, 1998 (JP) .................................................. 10-322324

(51) Int. Cl.[7] .................................................... G11B 5/40
(52) U.S. Cl. ......................................... 360/234.5; 360/245.8
(58) Field of Search ............................. 360/234.5, 245.8, 360/245.9; 29/603.07

(56) References Cited

U.S. PATENT DOCUMENTS

| | | | |
|---|---|---|---|
| 4,841,395 | * | 6/1989 | Craft ...................................... 360/103 |
| 5,721,651 | * | 2/1998 | Kitahara ................................ 360/103 |
| 6,146,813 | * | 11/2000 | Girard et al. ..................... 29/603.07 |

* cited by examiner

Primary Examiner—Robert S. Tupper
(74) Attorney, Agent, or Firm—Brinks Hofer Gilson & Lione

(57) ABSTRACT

A thin film magnetic head having a miniaturized slider, in which a wire connecting a head device with a bonding pad is free of a short circuit with an adjacent wire due to a ground layer for plating under a bump. A wire-insulating layer composed of an organic resin material and the like insulates the wires from each other and covers the upper layers thereof, and is provided with an opening so as to expose an end terminal. A manufacturing process is also disclosed.

2 Claims, 9 Drawing Sheets

THIN FILM MAGNETIC HEAD HAVING CLOSELY SPACED WIRES CONNECTING HEAD DEVICE WITH BONDING PADS

BACKGROUND OF THE INVENTION

1. Field of the Invention

The present invention relates to thin film magnetic heads and to manufacturing processes therefor. More particularly, the present invention relates to a thin film magnetic head having a plurality of closely spaced wires connecting a head device with bonding pads, and to a manufacturing process therefor.

2. Description of the Related Art

FIGS. 5A to 5C are drawings illustrating a conventional thin film magnetic head. FIG. 5A is a perspective view of the conventional thin film magnetic head, FIG. 5B is a cross-sectional view of the conventional thin film magnetic head along the line 5B—5B in FIG. 5A, and FIG. 5C is a partial perspective cross-sectional view of an important portion of the conventional thin film magnetic head. FIGS. 6A and 6B are drawings illustrating a pattern of wires in the conventional thin film magnetic head. FIG. 6A is a schematic plan view of the wires in the conventional thin film magnetic head, and FIG. 6B is a cross-sectional view of the conventional thin film magnetic head along the line 6B—6B in FIG. 6A. FIGS. 7A to 7D and FIGS. 8A to 8D are plan views and cross-sectional views of the conventional thin film magnetic head illustrating a production process therefor. FIG. 9 is a cross-sectional view of an important portion of another conventional thin film magnetic head.

A slider 1 of the thin film magnetic head mounted on a magnetic memory unit such as a hard disk, which is composed of a ceramic such as alumina-titanium carbide ($Al_2O_3$·TiC), has an air bearing surface (ABS) 1a (a floating surface; a surface opposing a magnetic memory medium) in the form of rails and a trailing side surface 1b as shown in FIG. 5A. On the trailing side surface 1b, there are provided a head device 2 and four bonding pads 3 to be connected to peripheral circuits.

As shown in FIG. 5B, the head device 2 is a so-called "complex thin film magnetic head", which is composed of a magnetoresistive magnetic head 2a (hereinafter referred to as an "MR head") for reading and an inductive magnetic head 2b (hereinafter, referred to as an "inductive head") for writing laminated on the MR head. The MR head 2a includes a lower sealed layer 2a1 composed of a Ni—Fe type alloy (Permalloy) laminated on the trailing side surface 1b of the slider 1, a lower gap layer 2a2 composed of a nonmagnetic material such as $Al_2O_3$ laminated on the lower sealed layer 2a1, a magnetoresistive element 2a3 disposed at the center of the upper surface of the lower gap layer 2a2, hard-bias layers (not shown) formed on both sides of the magnetoresistive element 2a3 as vertical biases, two conductive layers 2a4 (not shown) composed of a nonmagnetic conductive material such as Cr disposed on the upper surfaces of the hard bias layers, an upper gap layer 2a5 composed of a nonmagnetic material such as $Al_2O_3$ disposed on the upper layer of the magnetoresistive element 2a3 and the upper surface of the conductive layer 2a4, and an upper sealed layer 2a6 composed of a magnetic material such as a Ni—Fe type alloy (Permalloy) disposed on the upper surface of the upper gap layer 2a5.

As shown in FIGS. 5B and 5C, the inductive head 2b includes a lower core layer 2b1 which is also used as the upper sealed layer 2a6 of the MR head 2a, a nonmagnetic material layer 2b2 for forming a gap provided at the upper part of the lower core layer 2b1, a first coil-insulating layer 2b3 composed of an organic resin material or the like laminated on the nonmagnetic material layer 2b2, a flat helicoid coil 2b4 composed of a low resistance conductive material such as Cu disposed on the upper part of the first coil-insulating layer 2b3, a second coil-insulating layer 2b5 disposed so as to cover the coil 2b4, and an upper core layer 2b6 composed of a magnetic material such as a Ni—Fe type alloy (Permalloy). The upper core layer 2b6 at one end thereof contacts the nonmagnetic material layer 2b2 at the ABS surface 1a side, and is connected at the other end of the upper core layer 2b6 to the lower core layer 2b1 around the center C of the flat helicoid coil 2b4 through a hole H provided at the second coil-insulating layer 2b5.

As shown in FIG. 6A, four wires 4 (4a, 4b, 4c, and 4d) composed of a low resistance conductive material such as nickel (Ni) or copper (Cu) are disposed on the trailing side surface 1b which is the side portion of the head device 2, and each wire 4 has at one end thereof a wider end terminal E. The two wires 4a and 4b are connected at the other ends thereof to two ends of a coil 2b4 (a peripheral end and a central end), and the other two wires 4c and 4d are connected at the other ends thereof to the two conductive layers 2a4 of the MR head 2a, respectively (a connected state is not shown). The four wires are disposed in parallel in parts thereof, and are adjacent each other with minute spaces Sa in parallel parts thereof. As shown in FIG. 6B, a ground layer for plating 5 composed of a conductive material such as a Ni—Fe type alloy (Permalloy) is disposed so as to cover the upper and side parts of the four end terminals E, and a bump base 6 composed of a Ni—Fe type alloy (Permalloy) or the like is laminated on the ground layer for plating 5 disposed on the end terminal portion E. Four bumps 7 are disposed on the four bump bases 6, and each bump is composed of a conductive material such as Ni or Cu and has a vertical contact portion 7a to contact the bump base 6 and a brim 7b with wider tails.

As shown in FIG. 6B, a protection layer 8 composed of $Al_2O_3$ or the like is disposed on the entire surface of the trailing side surface 1b of the slider 1 in the state of covering the upper layers of the wires 4, the bumps 7, etc. By polishing the trailing side surface 1b, parts of the brims 7b of the four bumps 7 are exposed, and on each exposed upper part thereof is formed a bonding pad 3 composed of gold by a plating method. Thus, the four bonding pads 3 and the head device 2 are electrically connected, and the thin film magnetic head is thereby formed.

Next, a manufacturing process for the conventional thin film magnetic head will be explained. The lower core layer 2b1 composed of a Ni—Fe type alloy (Permalloy) and the nonmagnetic material layer 2b2 are laminated sequentially on the MR head 2a formed on the trailing side surface 1b of the slider 1, and then the first coil-insulating layer 2b3 is formed (not shown) with coating an organic resin material and the like on a nonmagnetic layer 2b2 by a photolithographic method. As shown in FIG. 7A (plan view) and FIG. 7B (cross-sectional view along the line 7B—7B in FIG. 7A), by using photo-lithographic and plating methods, the wires 4 (4a, 4b, 4c, and 4d) having end terminals E are formed on the slider 1 in the same step for forming the coil 2b4 by the use of copper or the like on the first coil insulating layer 2b3.

Next, as shown in FIG. 7C (plan view), by coating an organic resin material and the like so as to cover the coil 2b4, the second coil-insulating layer 2b5 is formed on the upper surface of the first coil-insulating layer 2b3 by a photolithographic method. The second coil-insulating layer 2b5 around the center C (see FIGS. 5b and 5c) of the coil 2b4 is provided with the hole H which reaches the lower core layer 2b1.

The ground layer for plating 5 composed of a Ni—Fe type alloy (Permalloy) or the like is formed by a method such as sputtering or deposition on the upper layers of the head device 2 and the wires 4, and on the entire surface of the trailing side surface 1*b* inside the hole H. The ground layer for plating 5 can be formed only on the areas where the upper core 2*b*6, the bump bases 6, and the bumps 7 are to be formed in a subsequent plating step, and can be utilized as electrodes therein. However, since a plurality of the ground layer for platings 5 interspersed respectively require connection to wires from a power supply, the complication explained above results in increased cost, that is, it is not feasible in practice. Consequently, the ground layer for plating 5 is formed on the entire trailing side surface 1*b* as described above.

Subsequently, by using a photolithographic method, a resist layer (not shown) having a window corresponding to a pattern of the upper core layer 2*b*6 is formed on the second coil-insulating layer 2*b*5, and a resist layer (not shown) having windows corresponding to patterns of the bump bases 6 is formed on the four end terminals E. As shown in FIG. 7D (cross-sectional view of the same portion shown in FIG. 7B; hereinafter, the same as above), by plating Ni—Fe type alloy (Permalloy) or the like, the upper core layer 2*b*6 is formed on the ground layer for plating 5 on the second coil-insulating layer 2*b*5 and in the hole H, and the bump base 6 is formed on the ground layer for plating 5 on the end terminal E. A residual resist layer (not shown) is removed by a wet etching method. The bump base 6 is formed to have the bump 7 high enough to protect the inductive head 2*b* from being damaged in a polishing step. That is, since the bump 7 formed on the bump base 6 is covered by a protective layer and then the protective layer is polished to expose the upper part of the bump 7, the maximum height of the bump 7 is necessarily greater than that of the inductive head 2*b* (height at the top of the upper core layer 2*b*6) so as to protect the inductive head 2*b* from being damaged in a polishing step. The taller bump is more preferable to ensure proper processing.

As shown in FIG. 8A, a resist layer 9 having a window 9*a* is formed so as to expose the upper part of the bump base 6 by a photolithographic method.

Next, as shown in FIG. 8B, the bump 7 is formed by plating Ni, Cu, or the like. In this step, since the bump 7 is necessarily as higher as possible above the inductive head 2, Ni or Cu is plated so as to exceed the thickness of the resist layer 9. Thus, Ni or Cu spreads at the periphery over the window 9*a*, so that the bump 7 is formed of a vertical contact portion 7*a* in accordance with the window 9*a*, and the brim 7*b* has a wider tail and a spherical form in cross-sectional by surface tension, in which the bottom end of the tail has an area equivalent to or exceeding that of the end terminal E.

The resist layer 9 is removed by a wet etching method, and then the four wires 4 are electrically insulated by removing the ground layer for plating 5 by an ion milling method utilizing argon (Ar) ions emitted from above (arrows in the Figure). In this step, the ground layer for plating 5 in shadow (areas indicated by the dotted lines in the Figures) of the brim 7*b* of the bump 7 is not removed and still continue to exist; however, the ground layer for plating 5 remaining between the end terminal E and the bump base 6 does not obstruct electrical connection and does not cause problems. The ground layer for plating 5 remaining adjacent to a side surface of the end terminal E is not an obstruction when the four wires are electrically insulated from each other.

As shown in FIG. 8D, the protective layer 8 composed of alumina is formed by a sputtering method so as to cover the upper surfaces of the upper core layer 2*b*6, wires 4, the bump 7 and the like. The surface of the protective layer 8 is polished until a part of the brim 7*b* thereunder is exposed (a part indicated by the dotted line in the Figure), and the bonding pads 3 composed of gold are formed by a plating method on the exposed part of the brim 7*b*; the thin film magnetic head is then complete as shown in FIG. 6B.

Recently, the size of the slider 1 of a thin film magnetic head has been reduced concomitant with an increase in memory capacity of magnetic memory units such as hard disks, and wires must be disposed efficiently in a limited area. As an area of a trailing side surface 1*b* becomes smaller with reduction in size of the slider 1, spaces Sb between the wires 4 in parallel portions thereof must be narrower, as shown in FIG. 9. Thus, when a space Sb in the parallel portion of wires 4 becomes narrower, a shadow of a brim 7*b* of a bump 7 may fall on an adjacent wire 4. Consequently, as shown in FIG. 9, when a ground layer for plating 5 is removed by an ion milling method after forming a bump 7 on an end terminal E and when four wires 4 are electrically insulated from each other, a ground layer for plating 5 remaining because of the shadow of the brim 7*b* of the bump 7 extends to an adjacent wire 4*b* so that the wire 4*b* is connected to the wire 4*c*, that is, a short circuit is formed.

One way to eliminate a short circuit caused by the ground layer for plating 5 remaining because of the shadow of the brim 7*b*, for example, is to change the form of the bump 7 into one having no brims 7*b*. That is, the bump 7 may be formed only in the form of the contact portion 7*a*, which substantially reduces shadowing by the brim 7*b* of the bump 7, and may eliminate most of the remaining ground layer for plating 5 which would otherwise not be removed. This may be achieved by thickening a resist layer 9 and by deepening a window 9*a*. However, since a resist layer not less than 20 μm thick above the bump base 6 must have a bump higher than a height of the inductive head 2*b* (height at the top of the upper core layer 2*b*6), the depth of focus becomes so deep that a pattern of the contact portion 7*a* through the resist layer 9 to the bottommost layer thereof (the bump base 6) cannot be accurately developed. That is, even though the bump as described above is formed, secure electric connection may not be obtained. Moreover, the shape of the bump 7 described above is very difficult to produce in a single manufacturing step.

Another way to eliminate a short circuit caused by the ground layer for plating 5 remaining because of the shadow of the brim 7*b* is to make the widths of the wires 4 narrower so as to form wider spaces therebetween while disposing the four wires 4 in the same location. However, resistance in the four wires 4 increases and the consumption of electric power is undesirably increased thereby. Furthermore, in this case, the brim portion 7*b* is also required to be smaller; however, considering the problem in the exposure step of a photolithographic method discussed above, this may not be achieved by deepening the contact portion 7*a* (i.e., the window 9*a*) and by reducing the amount of plating above the height of the resist layer 9 when the brim portion 7*b* is formed. When the amount of plating above the height of the resist layer 9 decreases while the depth of the contact portion 7*a* (the window 9*a*) is maintained, the height of the bump 7 cannot be higher than the inductive head 2*b*, as described above.

SUMMARY OF THE INVENTION

Accordingly, it is an object of the present invention to provide a thin film magnetic head and a manufacturing process therefor, in which a wire connecting a head device with a bonding pad is free of short circuits by a ground layer for plating under a bump base, whereby a slider can be miniaturized.

To this end, there is provided a thin film magnetic head having a magnetoresistive magnetic head for reading provided with a magnetoresistive element and/or an inductive magnetic head for writing provided with a coil. The thin film magnetic head comprises a plurality of spaced wires, each end of which is respectively connected to two ends of the coil and/or to two ends of the magnetoresistive element, a wire-insulating layer composed of an organic resin material, which insulates the wires from each other and covers the upper parts thereof, and has openings where the other ends of the wires are exposed, a ground layer for plating composed of a conductive metallic material, which is disposed on the other ends of the wires exposed in the openings and on the wire-insulating layer adjacent to the openings, and bumps electrically connected to the upper surface of the ground layer for plating.

Hence, even though a slider of a thin film magnetic head and an area of a trailing side surface are miniaturized concomitant with increases in memory capacities of magnetic memory units such as hard disks, by virtue of the configuration of the thin film magnetic head described above, the wire is free of short circuits with adjacent wires by the ground layer for plating under the bump, i.e., the wires are well insulated, so that a miniaturized thin film magnetic head can be obtained.

In the thin film magnetic head of the present invention, the bump may be disposed on the ground layer for plating through a bump base composed of a conductive material.

Accordingly, a thin film magnetic head, which has electric connection between the bumps and the wires, can be obtained without damage to the inductive head.

In a manufacturing process for manufacturing the thin film magnetic head of the present invention, the thin film magnetic head includes a magnetoresistive magnetic head for reading provided with a magnetoresistive element and a conductive layer connected to both ends of the magnetoresistive element, and/or an inductive magnetic head provided with a coil formed between an upper core layer and a lower core layer. The manufacturing process comprises the steps of respectively connecting each end of a plurality of the wires with both ends of the conductive layer and/or with two ends of the coil, and forming an end terminal at the other end of each wire, coating the coil-insulating layer composed of an organic resin material on the coil and a plurality of the wires except for the end terminals thereof, and forming openings to expose the end terminals, forming the ground layer for plating on the insulating layer and on the end terminals exposed in the openings, forming the bump bases by a plating method on the ground layer for plating in the openings, forming the bumps on the bump bases to be connected to peripheral circuits, and removing the ground layer for plating by an ion milling method by the use of the bumps as masks.

Recently, the area of the trailing side surface has been reduced by reducing the size of the slider of a thin film magnetic head concomitant with increases in memory capacities of magnetic memory units such as hard disks, and as a result, a part of the ground layer for plating under the bump still remains after a removing step therefor. However, even though a part of the ground layer for plating remains, when a second coil-insulating layer and a wire-insulating layer are formed simultaneously in the same step by using the same organic resin material so that a wire does not form a short circuit with an adjacent wire, the thin film magnetic head can be manufactured easily without any additional steps, and the manufacturing cost of the magnetic head can be reduced.

The manufacturing process may comprise the steps of forming the hole reaching the lower core layer in the coil-insulating layer in the step for forming the opening, forming the ground layer for plating inside the hole in the step for forming the ground layer for plating, and forming the upper core layer on the ground layer for plating in the hole and on the coil-insulating layer in the step for forming the bump bases.

Consequently, the thin film magnetic head can be manufactured while preventing the inductive head from being damaged when the upper part of the bumps are polished.

DESCRIPTION OF THE PREFERRED EMBODIMENT

Figure 1A:
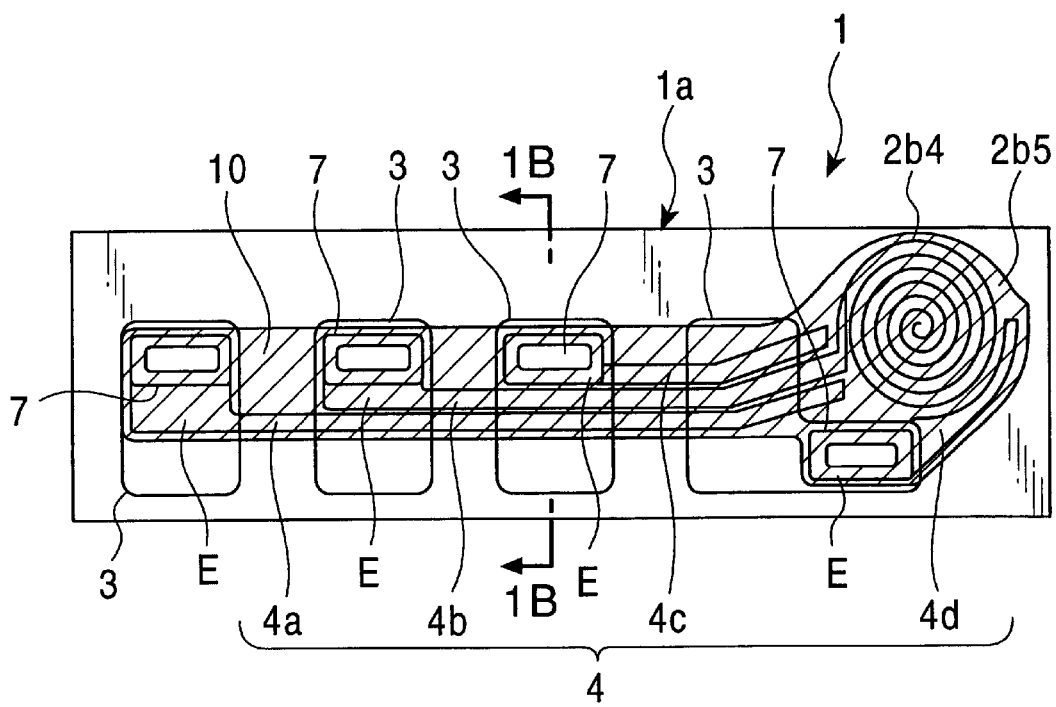
FIGS. 1A and 1B are drawings illustrating a pattern of wires in a thin film magnetic head according to the present invention.
Figure 1B:
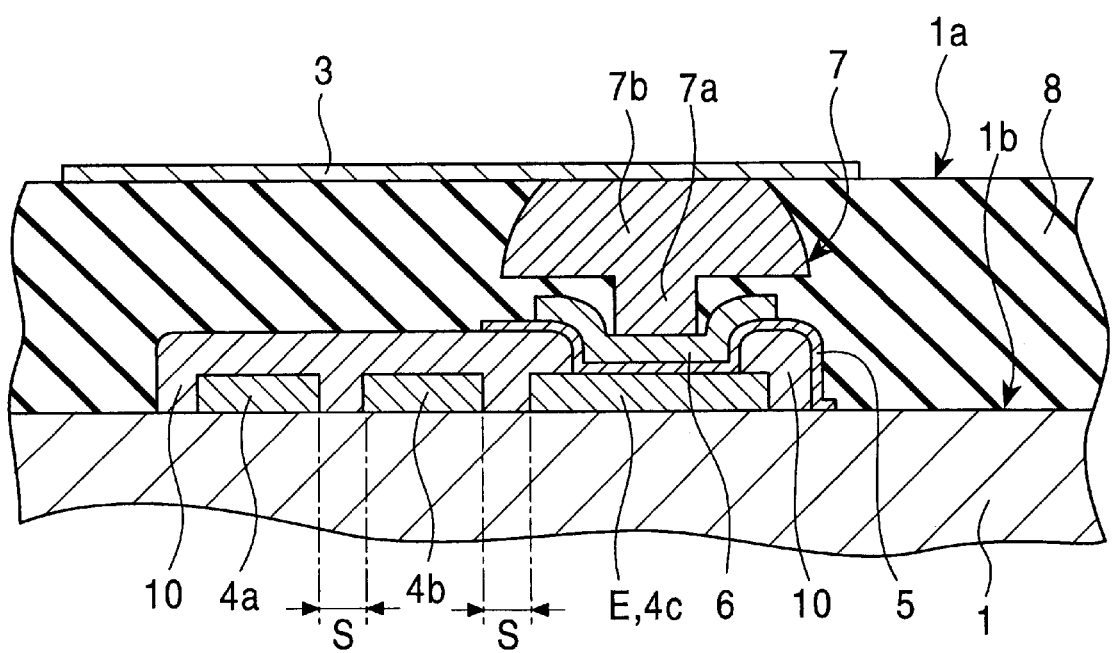

An embodiment of a thin film magnetic head according to the present invention will be described. FIGS. 1A and 1B are drawings illustrating a pattern of wires in the thin film magnetic head of the present invention. FIG. 1A is a schematic plan view of the wires in the thin film magnetic head of the present invention, and FIG. 1B is a cross-sectional view along the line 1B—1B of FIG. 1A. FIGS. 2A to 2D, FIGS. 3A to 3D, and FIGS. 4A to 4C are plan views and cross-sectional views illustrating a manufacturing process for the thin film magnetic head of the present invention. Parts (portions) similar to those of a conventional thin film magnetic head are denoted by like reference numbers and explanations thereof are partly omitted.

Figure 5A:
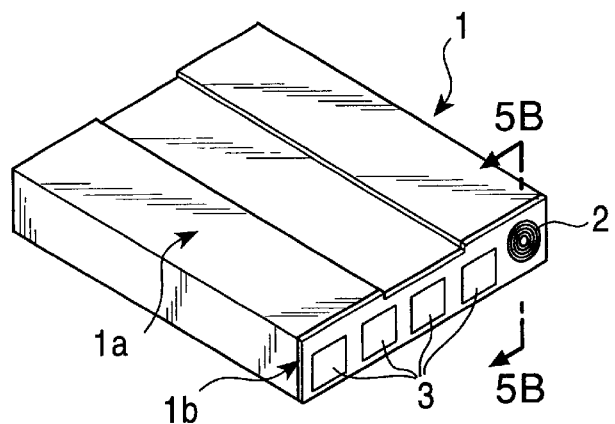
FIGS. 5A to 5C are drawings illustrating a conventional thin film magnetic head.

In the thin film magnetic head of the present invention, similarly to the conventional thin film magnetic head shown in FIG. 5A, a slider 1 composed of a ceramic such as alumina-titanium carbide ($Al_2O_3TiC$) has an ABS surface 1$a$ (a floating surface) in the form of rails and a trailing side surface 1$b$. On the trailing side surface 1$b$, there are provided a head device 2 and four bonding pads 3 to be connected to peripheral circuits.

Figure 5B:
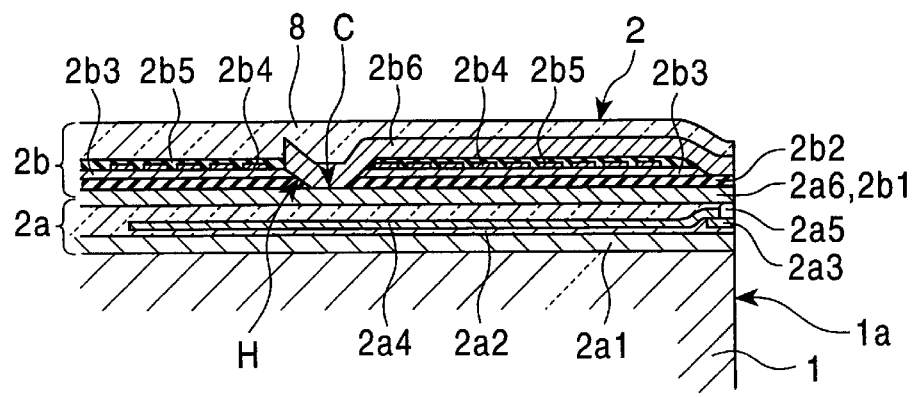

The head device 2 is a so-called "complex thin film magnetic head", similar to the conventional thin film magnetic head shown in FIG. 5B, which is composed of a MR head 2a for reading and an inductive head 2b for writing laminated on the MR head 2.

As shown in FIG. 1, four wires 4 (4a, 4b, 4c, and 4d) composed of a low resistance conductive material such as nickel (Ni) or copper (Cu) are disposed on the trailing side surface 1b which is the side portion of the head device 2 and each wire 4 has at one end thereof a wider end terminal E. The two wires 4a and 4b are connected at the other ends thereof to both ends of a coil 2b4 (a peripheral end and a central end), and the other two wires 4c and 4d are connected at the other ends thereof to two conductive layers 2a4 of the MR head 2a, respectively (connected state not shown). The four wires 4 are disposed in parallel in parts thereof and are adjacent each other with minute spaces S in parallel parts thereof.

A wire-insulating layer 10 composed of an organic resin or the like is formed so as to insulate the wires 4 from each other and to cover the upper layers thereof as shown in FIG. 1B, and so as to allow an opening 10a for exposing the upper part of the end terminal portions E. A ground layer for plating 5 composed of a conductive material such as a Ni—Fe type alloy (Permalloy) is disposed so as to cover the upper parts of the end terminals E and the adjacent wire-insulating layer 10. The bump base 6 composed of a Ni—Fe type alloy (Permalloy) or the like is laminated on the ground layer for plating 5 disposed on the end terminal E. That is, the ground layer for plating 5 is disposed between the wires 4 and the bump bases 6. The four bumps 7 composed of a conductive material such as Ni or Cu having vertical contact portions 7a to contact the bump bases 6, and brims 7b with wider tails are disposed on the four bump bases 6.

A protection layer 8 composed of Al$_2$O$_3$ or the like is disposed on the entire surface of the trailing side surface 1b of the slider 1 so as to cover the upper layers of the wires 4, the wire-insulating layer 10, and the bumps 7 and the like. By polishing the trailing side surface 1b, a part of each brim 7b of the four bumps 7 becomes exposed, and on each exposed upper part thereof are formed bonding pads 3 composed of gold by a plating method. Thus, the four bonding pads 3 and the head device 2 are electrically connected, so that the thin film magnetic head is formed. In FIG. 1B, a cross-sectional view that crosses the end terminal E of the wire 4c and includes a part having the wires 4a and 4b is shown as an example, but areas of the end terminals E adjacent to the other wires 4 have equivalent structures.

Heretofore, since the wire-insulating layer 10 is filled in the minute spaces between the plural wires 4 and the ground layer for plating 5 for the bump bases 6 is formed on the wire-insulating layer 10, insulation characteristics between a plurality of wires 4 can be improved, so that the slider can be miniaturized. The effect explained above is not limited only to the pattern of the wires 4 as described above. Regardless of the state of connections between each wire 4 and the coil 2b4, and/or between each wire 4 and MR head 2a, the same effect can be anticipated when plural wires 4 are disposed in a coadjacent state.

Figure 2A:
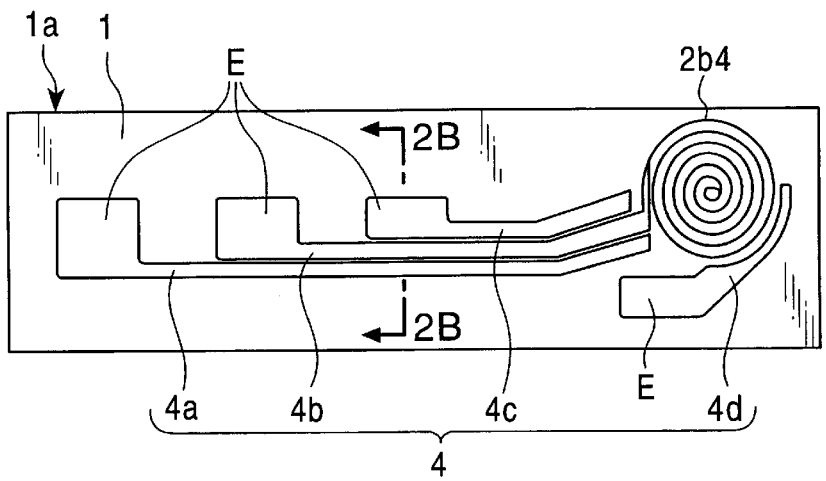
FIGS. 2A to 2D are plan views and cross-sectional views illustrating a manufacturing process for the thin film magnetic head according to the present invention.
Figure 2B:
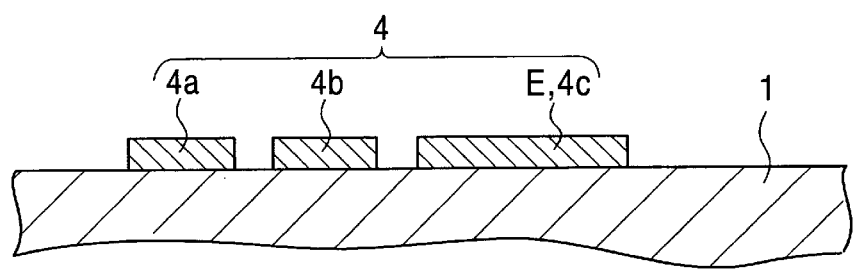

Next, a manufacturing process for the thin film magnetic head according to the present invention will be explained. A lower core layer 2b1 composed of Ni—Fe type alloy (Permalloy) and a nonmagnetic material layer 2b2 are laminated sequentially on the MR head 2a formed on the trailing side surface 1b of the slider 1, and then a first coil-insulating layer 2b3 is formed (not shown) by coating an organic resin material or the like by a photolithographic method. As shown in FIG. 2A (plan view) and FIG. 2B (cross-sectional view along the line 2B—2B in FIG. 2A), by photolithographic and plating methods, the wires 4 (4a, 4b, 4c, and 4d) having the end terminals E are formed on the slider 1 in the same process for forming the coil 2b4 by use of copper or the like on the first coil-insulating layer 2b3.

Figure 2C:
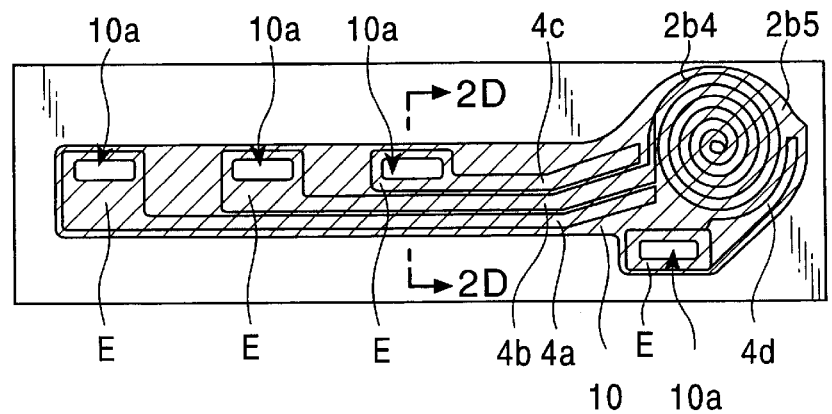
Figure 2D:
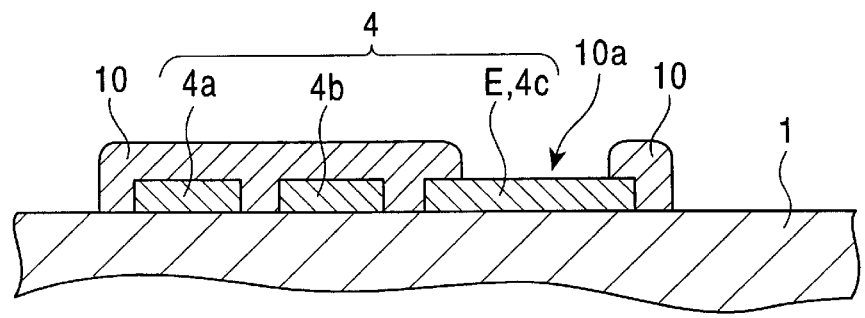
Figure 5C:
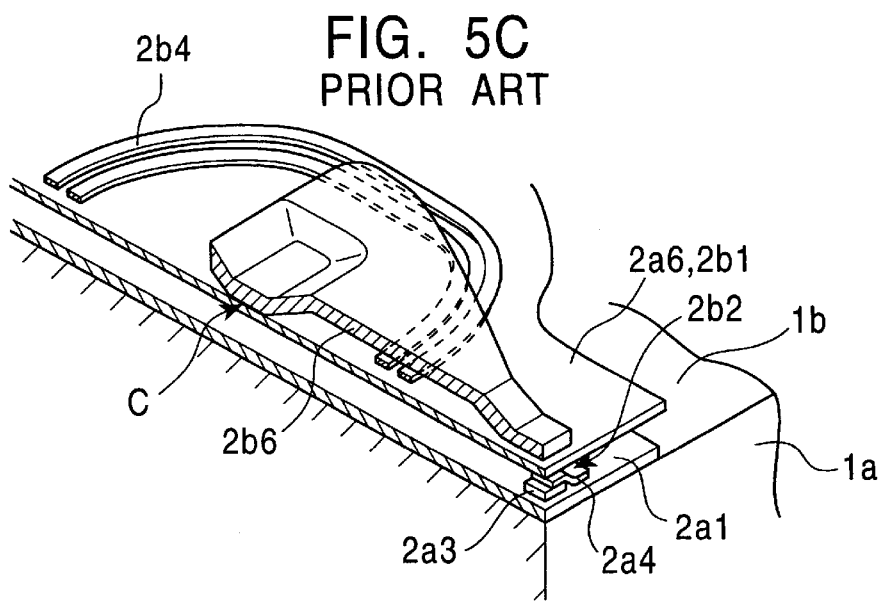
Figure 6A:
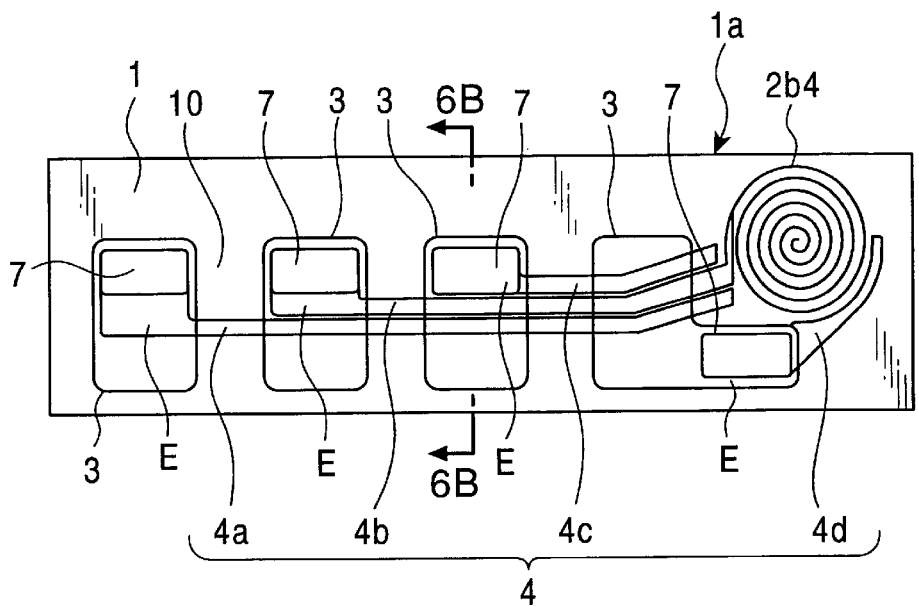
FIGS. 6A to 6B are drawings illustrating a pattern of wires in a conventional thin film magnetic head.
Figure 6B:
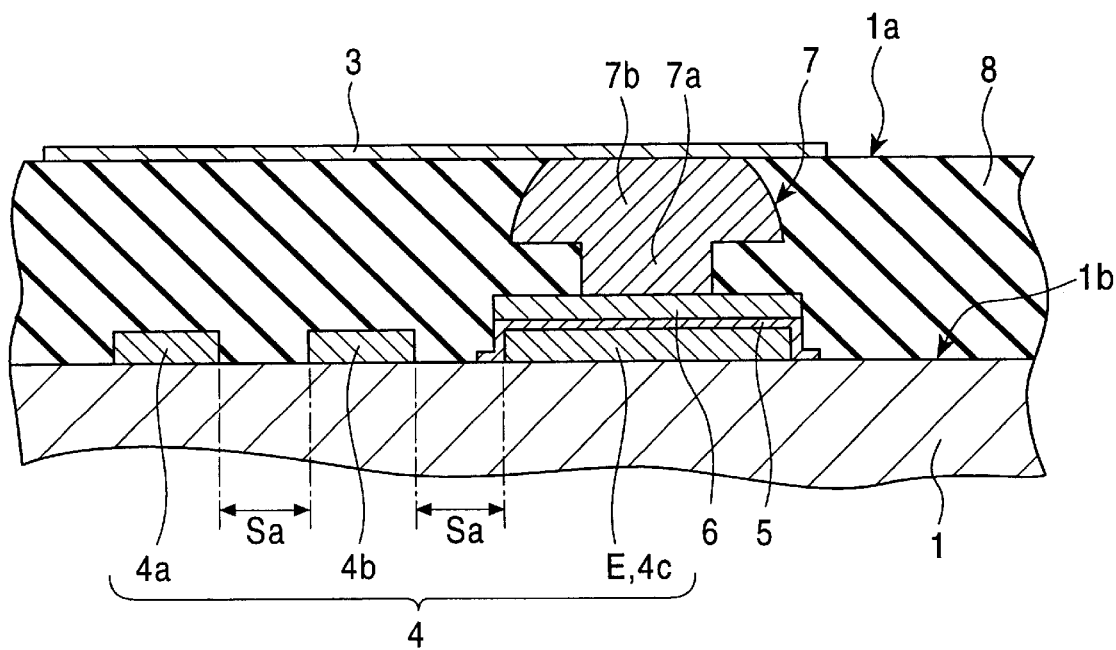
Figure 7A:
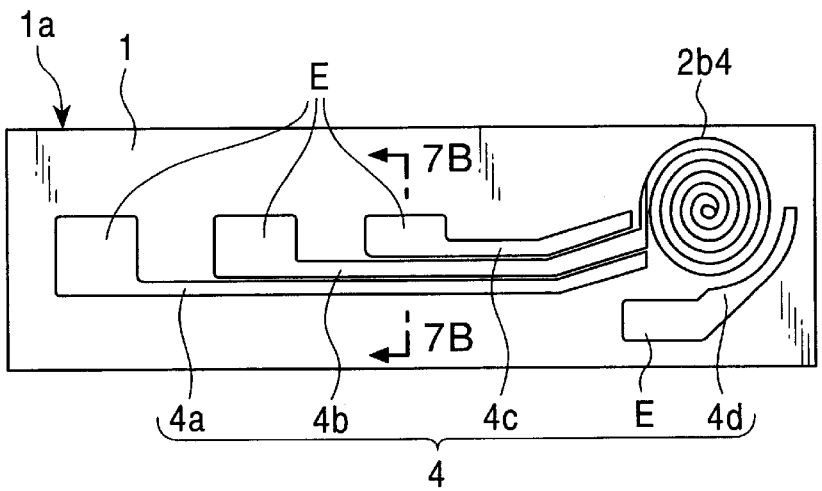
FIGS. 7A to 7D are plan views and cross-sectional views illustrating a manufacturing process for a conventional thin film magnetic head.
Figure 7B:
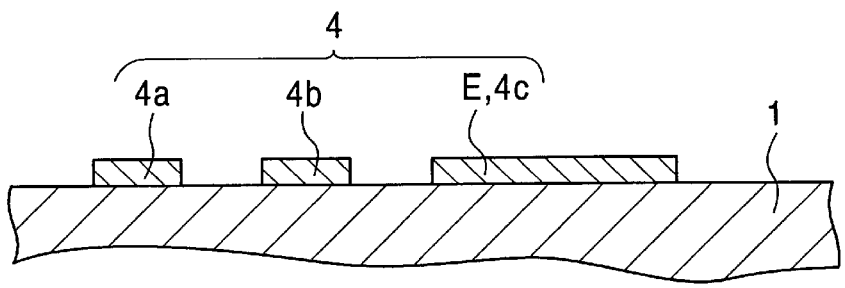
Figure 7C:
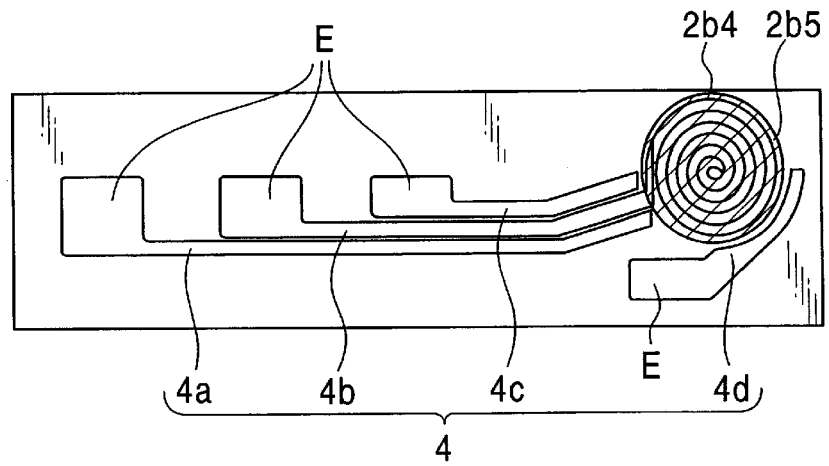
Figure 7D:
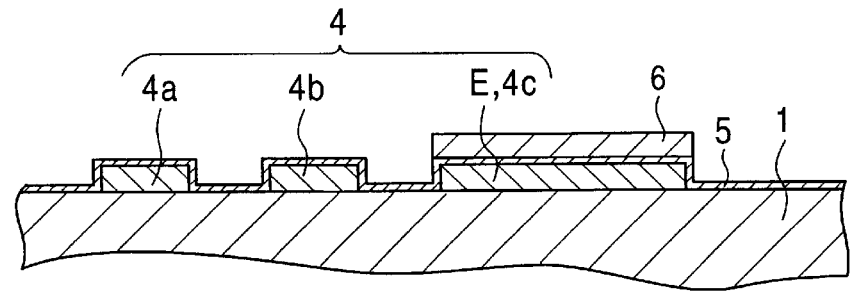
Figure 8A:
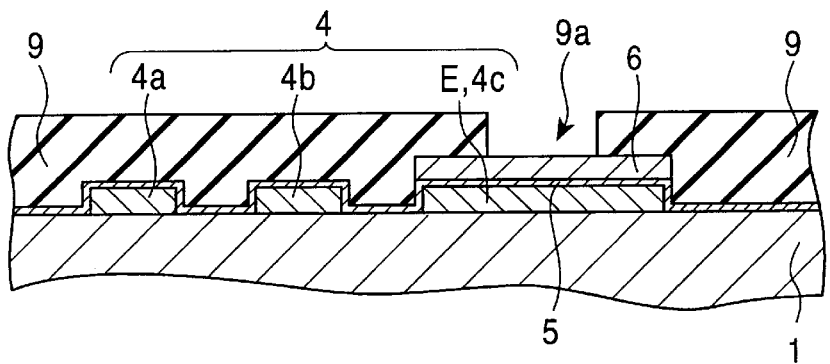
FIGS. 8A to 8D are cross-sectional views illustrating the manufacturing process for a conventional thin film magnetic head.
Figure 8B:
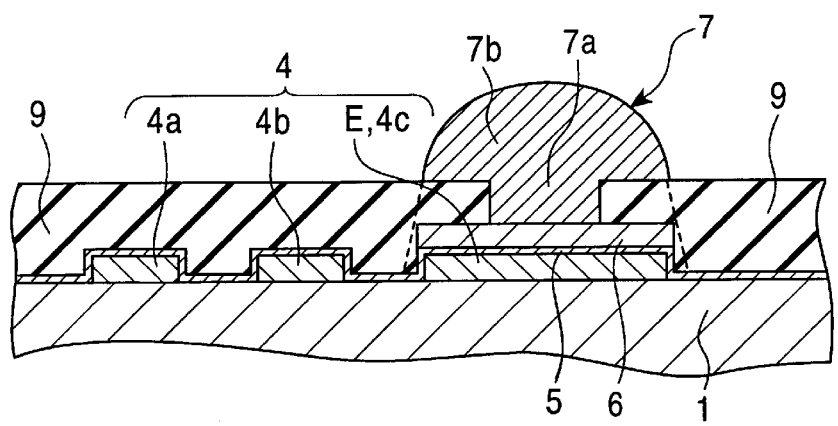
Figure 8C:
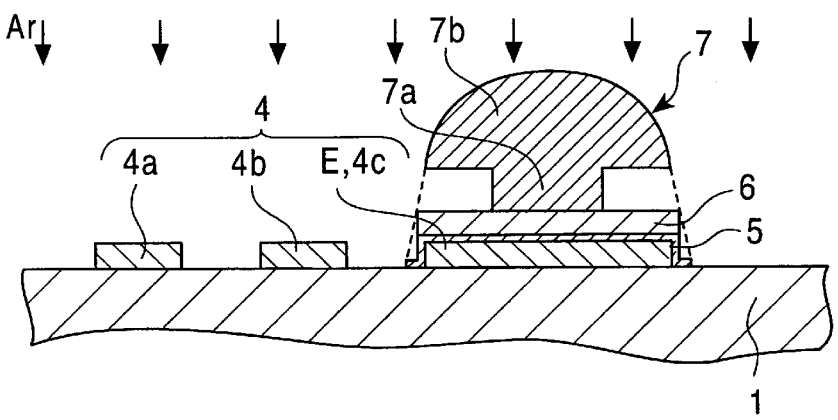
Figure 8D:
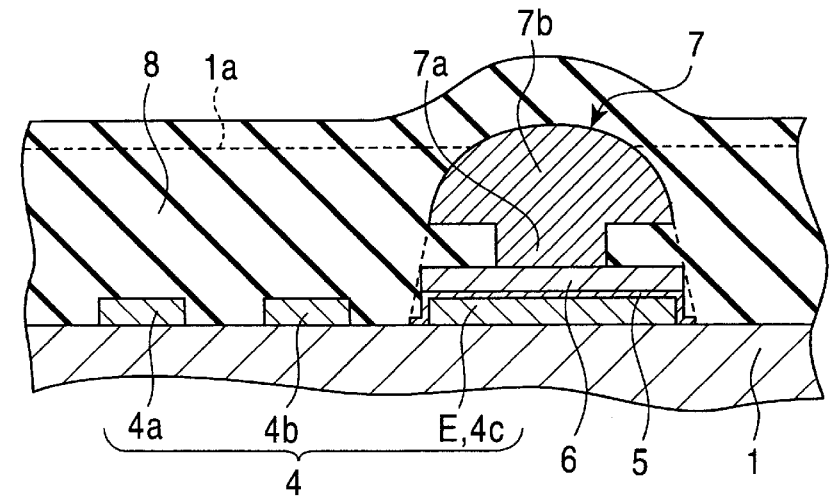
Figure 9:
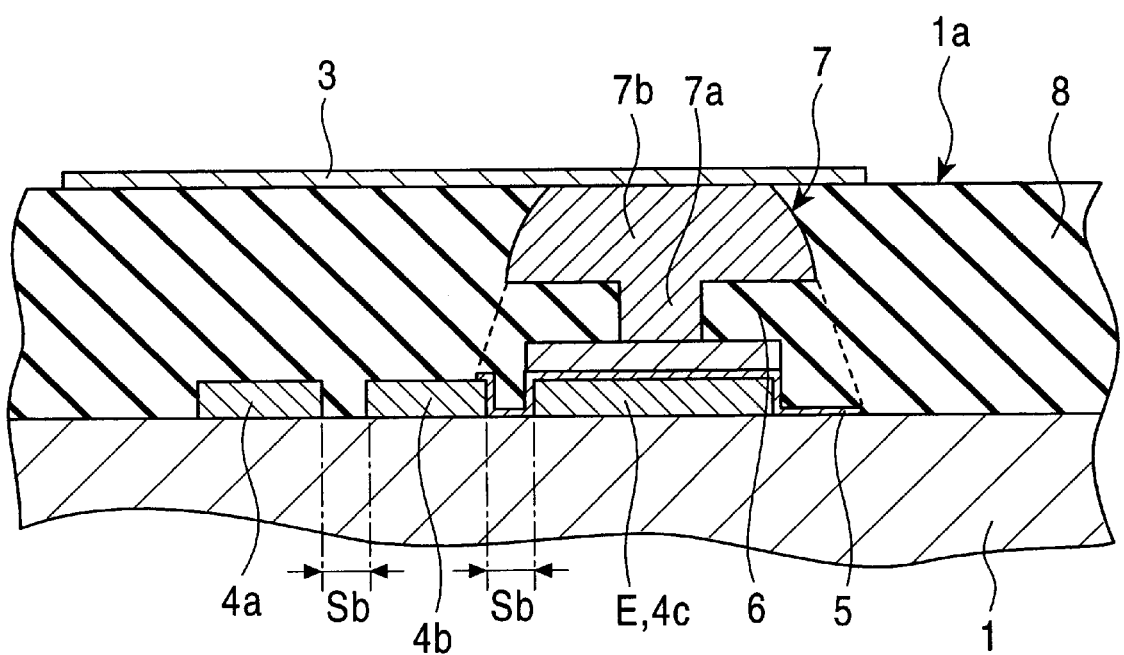
FIG. 9 is a cross-sectional view of an important part of another conventional thin film magnetic head.

Next, as shown in FIG. 2C (plan view), by coating an organic resin material or the like so as to cover the upper layers of the coil 2b4 and the wires 4, and then by a photolithographic method, the second coil-insulating layer 2b5 is formed on the upper surface of the first coil-insulating layer 2b3 and the wire-insulating layer 10 is formed on the upper layer of the wires 4 (a diagonally shaded portion). As shown in FIG. 2C and 2D (cross-sectional view along the line 2D—2D in FIG. 2C), the wire-insulating layer 10 is formed to have an opening 10a so that the upper part of each end terminal E is exposed. The coil-insulating layer 2b5 and the wire-insulating layer 10 can be formed in separate steps; however, they may be formed easily by using the same material in the same step, so that manufacturing cost may be reduced. The second coil-insulating layer 2b5 in the proximity of the center C (see FIGS. 5band 5c) of the coil 2b4, is provided with the hole H which reaches the lower core layer 2b1.

Figure 3A:
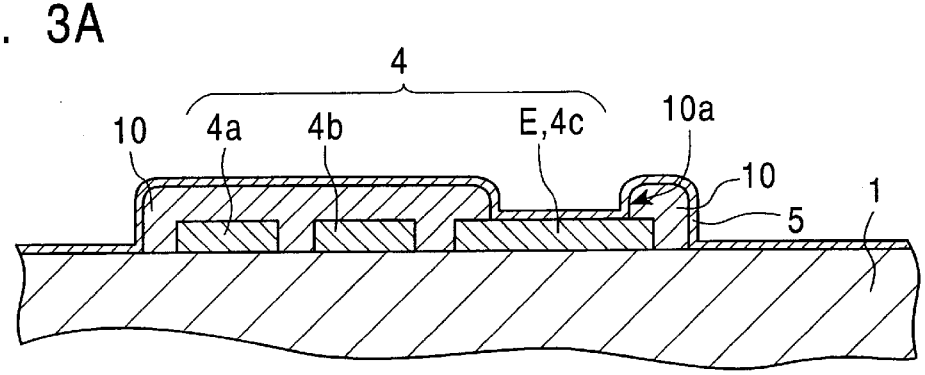
FIGS. 3A to 3D are cross-sectional views illustrating a manufacturing process for the thin film magnetic head according to the present invention.

As shown in FIG. 3A (cross-sectional view of the same portion in FIGS. 2B and 2D; hereinafter, the same as above), the ground layer for plating 5 composed of a Ni—Fe type alloy (Permalloy) or the like is formed by a method such as sputtering or deposition, on the upper layers of the head device 2, the wires 4, and the wire-insulating layer 10, and on the entire surface of the trailing side surface 1b inside the hole H.

Figure 3B:
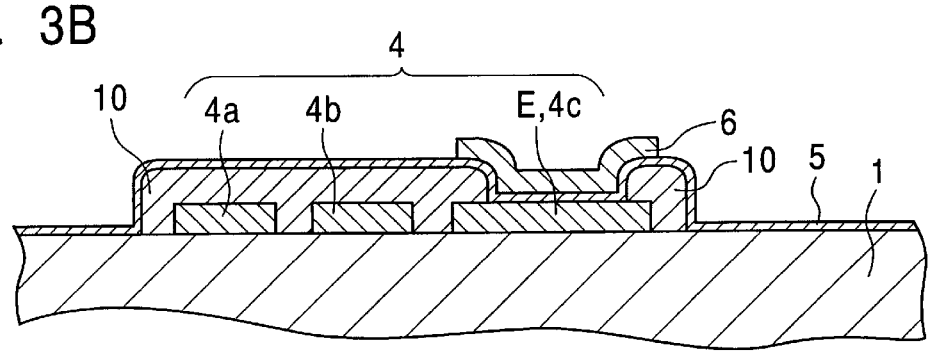

Subsequently, by using a photolithographic method, a resist layer (not shown) having a window corresponding to a pattern of the upper core layer 2b6 is formed on the second coil-insulating layer 2b5, and a resist layer (not shown) having windows corresponding to patterns of the bump bases 6 is formed on the four end terminals E and on the wire-insulating layer 10 adjacent thereto. As shown in FIG. 3B, by plating Ni—Fe type alloy (Permalloy) or the like, the upper core layer 2b6 is formed on the ground layer for plating 5 on the second coil-insulating layer 2b5 and in the hole H, and the bump base 6 is formed on the ground layer for plating 5 on the end terminal E. A residual resist layer (not shown) is removed by a wet etching method. The bump base 6 is formed to have the bump 7 high enough to protect the inductive head 2b from damage in a polishing step. That is, since the bump 7 formed on the bump bases 6 is covered by a protective layer and then the protective layer is subsequently polished to expose the upper part of the bump 7, the maximum height of the bump 7 is necessarily higher than that of the inductive head 2b (height at the top of the upper core layer 2b6) so as to protect the inductive head 2b from damage in a polishing step. A higher bump is more preferable to ensure proper processing.

Figure 3C:
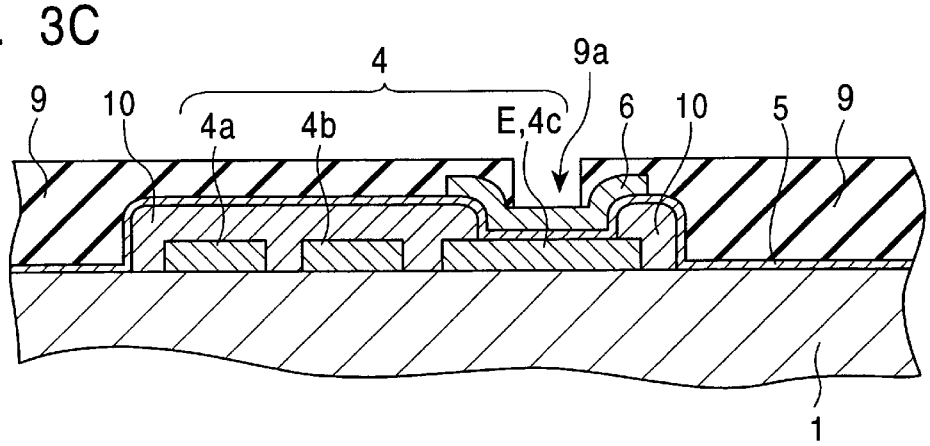

As shown in FIG. 3C, a resist layer 9 having a window 9a is formed so as to expose the upper part of the bump base 6 by a lithographic method.

Figure 3D:
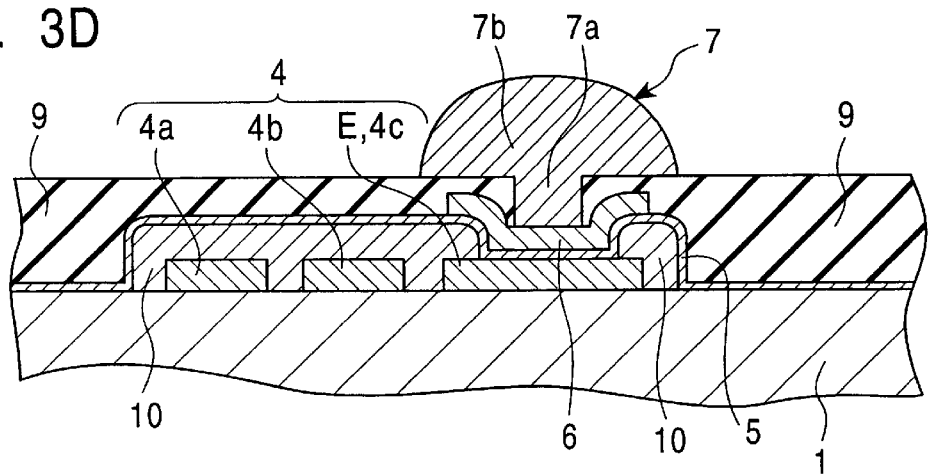

Next, as shown in FIG. 3D, the bump 7 is formed by plating Ni, Cu, or the like. In this step, since the bump 7 is necessarily as higher than the inductive head 2 as possible, Ni or Cu is plated so as to exceed the thickness of the resist layer 9. Thus, Ni or Cu spreads over the periphery of the window 9a, so that the bump 7 is formed of a vertical contact portion 7a in accordance with the window 9a and the brim 7b having a wider tail and a spherical form in cross-section by surface tension, in which the bottom end of the tail has an area equivalent to or exceeding that of the end terminal E.

Figure 4A:
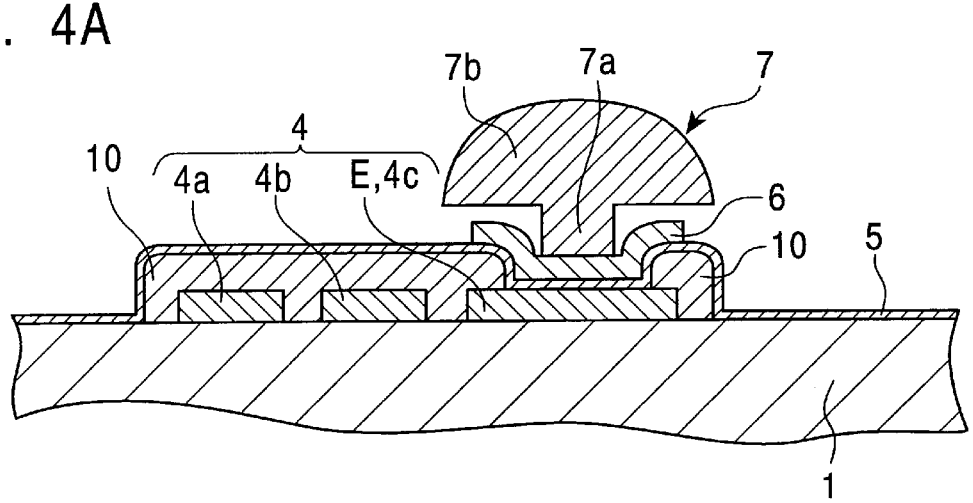
FIGS. 4A to 4C are cross-sectional views illustrating a manufacturing process for the thin film magnetic head according to the present invention.
Figure 4B:
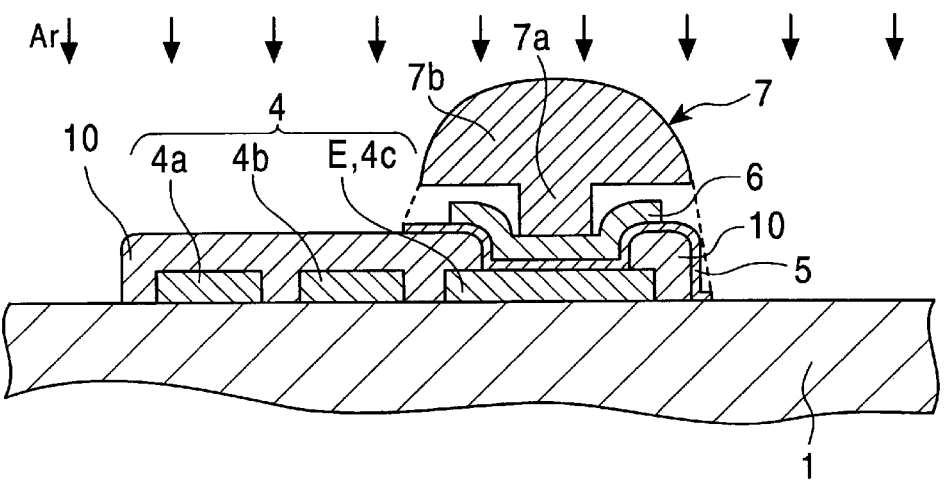

As shown in FIG. 4A, the resist layer 9 is removed by a wet etching method. Next, as shown in FIG. 4B, the four wires 4 are electrically separated by removing the ground layer for plating 5 by an ion milling method utilizing argon (Ar) ion emitted from above. In the step, the ground layer for plating 5 in shadow (an area indicated by the dotted line in the Figure) of the brim portion 7b of the bump 7 is not removed by an ion milling method and remains; however, the remaining ground layer for plating 5 does not cause short circuits between plural adjacent wires 4 since the wires 4 adjacent to the end terminals E are covered to be insulated beforehand by the wire-insulating layer 10.

Figure 4C:
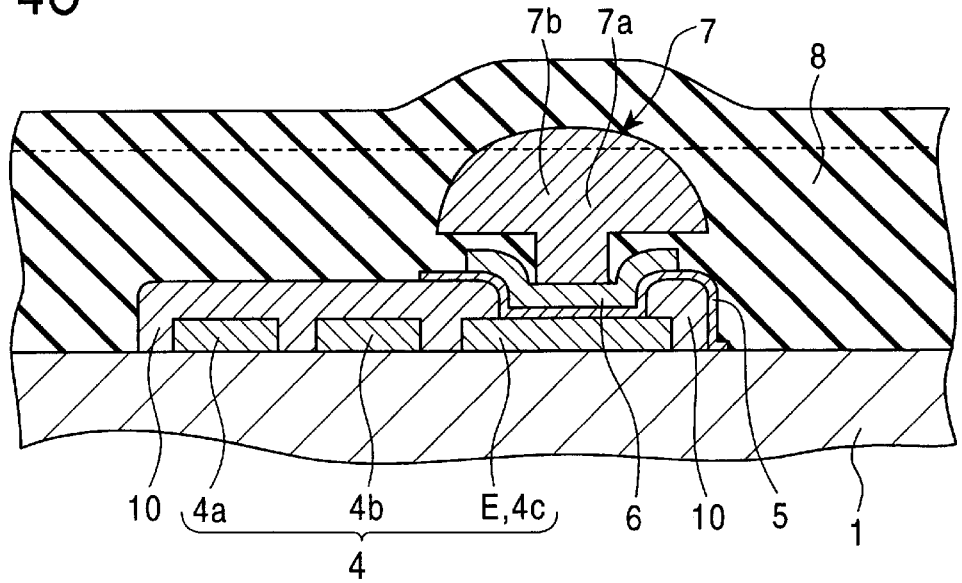

As shown in FIG. 4C, the protective layer 8 composed of alumina is formed by a sputtering method so as to cover the upper surfaces of the upper core layer 2b6, the wires 4, the bumps 7, etc. The surface of the protective layer 8 is polished until a part of the brim 7b thereunder is exposed (a part indicated by the dotted line in the Figure), and the bonding pad 3 composed of gold is formed by a plating method on the exposed part of the brim 7b. Thus, the thin film magnetic head shown in FIGS. 1A and 1B is completed. In FIGS. 2A to 2D, and 3A to 3D, the cross-sectional views that cross the end terminal E of the wire 4c and include a part having the wires 4a and 4b are shown as examples, but areas of the end terminals E adjacent to the other wires 4 have equivalent structures.

What is claimed is:

1. A thin film magnetic head comprising at least one component of a magnetoresistive magnetic reading head having a magnetoresistive element and an inductive magnetic writing head having a coil; a plurality of spaced wires provided at a distance, an end of each of the wires being connected to and end of the component; a wire-insulating layer comprising an organic resin material, which insulates the wires from each other, covers the upper parts thereof, and has openings for exposing the other ends of the wires; a ground layer for plating comprising a conductive metallic material, which is disposed over the other ends of the wires and the wire-insulating layer adjacent to the periphery of the openings, and bumps electrically connected to the upper part of the ground layer for plating.

2. A thin film magnetic head according to claim 1, wherein each of the bumps is disposed on the ground layer for plating through a bump base comprising a conductive material.

* * * * *

UNITED STATES PATENT AND TRADEMARK OFFICE
CERTIFICATE OF CORRECTION

PATENT NO. : 6,256,170 B1          Page 1 of 1
DATED : July 3, 2001
INVENTOR(S) : Kenji Honda It is certified that error appears in the above-identified patent and that said Letters Patent is hereby corrected as shown below:

<u>Title page,</u>
ABSTRACT, line 1, delete "," (comma) immediately after "slider".

<u>Column 10,</u>
Line 13, delete "and" and substitute -- an -- in its place.

Signed and Sealed this

Twenty-eighth Day of May, 2002

Attest:

JAMES E. ROGAN
*Attesting Officer*     *Director of the United States Patent and Trademark Office*